Jan. 31, 1933.  W. C. PITTER  1,895,678
CLUTCH
Filed Dec. 20, 1930   2 Sheets-Sheet 1

Inventor
Walter Charles Pitter
By Luther Johns
atty.

Jan. 31, 1933.   W. C. PITTER   1,895,678
CLUTCH
Filed Dec. 20, 1930   2 Sheets-Sheet 2

Inventor
Walter Charles Pitter
By Luther Johns
Atty.

Patented Jan. 31, 1933

1,895,678

UNITED STATES PATENT OFFICE

WALTER CHARLES PITTER, OF EPPING, ENGLAND, ASSIGNOR TO THE PITTER TRUST, OF CHICAGO, ILLINOIS, A COMMON LAW TRUST

CLUTCH

Application filed December 20, 1930. Serial No. 503,673.

This invention relates to clutches. It has for its objects the provision of a clutch device which is peculiarly positive and quick in action, one which is strong and durable, of few parts (disregarding the numerous balls), and simple in construction and assembly.

Figure 1:
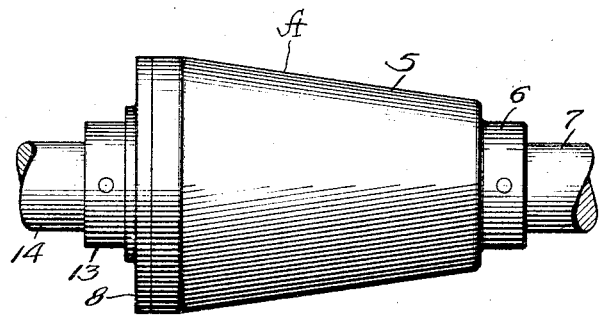
Figure 1 is an elevation of the device of either form shown.
Figure 2:
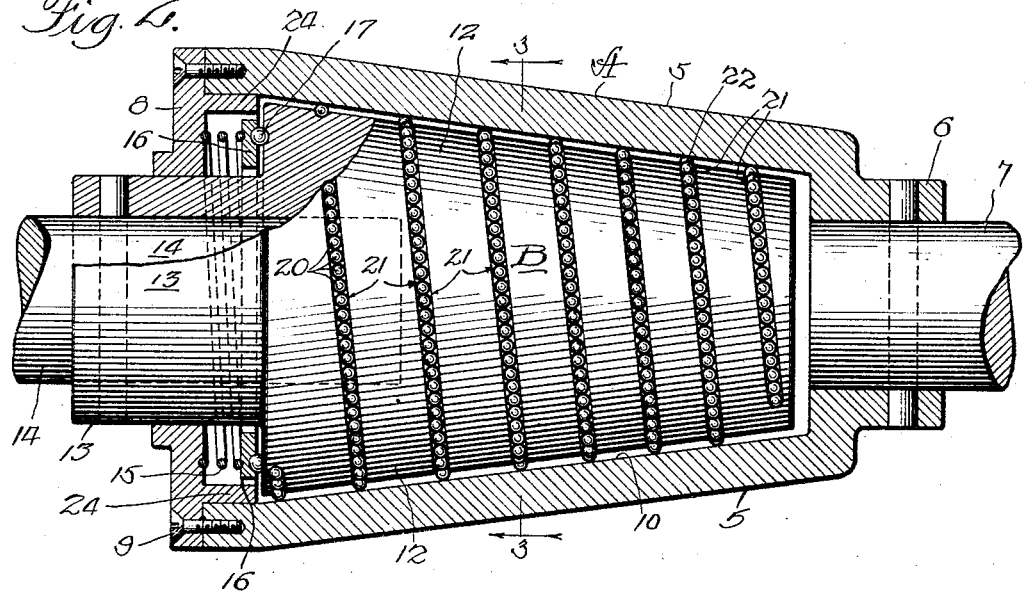
Fig. 2 is a medial longitudinal section of the preferred form, on an enlarged scale, with the inner member in elevation.
Figure 3:
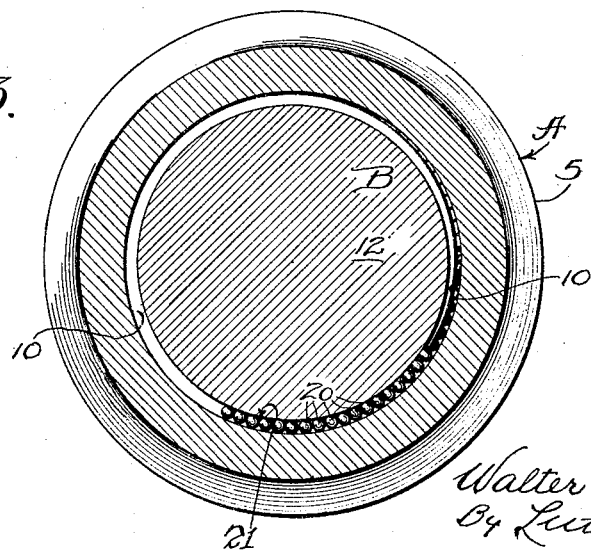
Fig. 3 is a cross section on the line 3—3 of Fig. 2.

Referring to Figs. 2 and 3 the outer member A comprises a shell-like body 5 having at one end a hub 6 to which shaft 7 is secured and having at its other end a closure wall 8 held by screws 9 to the body 5. The inner surface 10 has the shape of a truncated cone on the axis of the device.

Inner member B comprises a body 12 having the truncated cone shape of surface 10 and interfits with that surface, but in spaced relation. The body 12 has a stem, shaft or hub 13 to which shaft 14 is secured.

Between plate 8 and body 12 there is an expansion spring 15 pressing against a flat ring 16 providing with the end of body 12 a race for balls 17 forming a ball bearing.

Between the bodies 5 and 12 are numerous balls 20 in spiral arrangement. Rollers could be used instead of balls. They may be in one series or in more than one. This form of the device contemplates that one of the members A or B will have a seat or seats for these balls, the seats being arranged spirally. I have shown member B having the spiral seats, which are in the form of a spiral groove 21 around the conical periphery of the body 12, and shown as extending from one end of body 12 to the other end thereof.

The groove or grooves as 21 have a depth appropriately about half the diameter of the steel balls 20 which occupy the groove or spiral slot 21 in close arrangement. The grooves terminate within the periphery of the head 12 so the balls can not escape. They can be applied, as one way, by coating the groove or seat with grease and causing the balls to adhere therein and then inserting member B into member A.

Since spring 15 causes the balls 20 to be maintained in close association with conical surface 10, and since the series of balls has screw thread properties, the action is such that when either member A or B is rotated in what would be the unthreading direction the two members are not clutched together but the driving one moves freely with respect to the other. On the other hand, should the driving member (which may be either member A or B) be rotated in a direction as if to thread it into or upon the other member, a gripping action takes place and the two members are locked together. Should the driving power be interrupted the driven member may continue to move in the direction in which it was being driven. This clutch is therefore appropriate to situations calling for "free-wheeling".

This clutch presents a large number of elements widely distributed and which simultaneously exercise a gripping action to move the driven member. The action is substantially instantaneous with the slightest relative movement in the screw-threading rotative direction. The clutch is peculiarly reliable, meaning free from slippage and delivering uniformly and consistently a notably precise output. This is important where for example, there is a back-and-forth ratchet-like movement of the driving member and an exact reproduction of the amount of that movement is desired in the output. It is important also where an immediate, strong and powerful grip is needed, and also where an instantaneous release and a free-running condition of the driven member are desired.

The ring-like extension 24 integral with plate 8 maintains the inner and outer members against material longitudinal displacement relative to each other, while spring 15 maintains the balls in such close association with the wall defining the conical recess in member A that the gripping action takes place on the slightest movement in the screw-threading direction.

Figure 4:
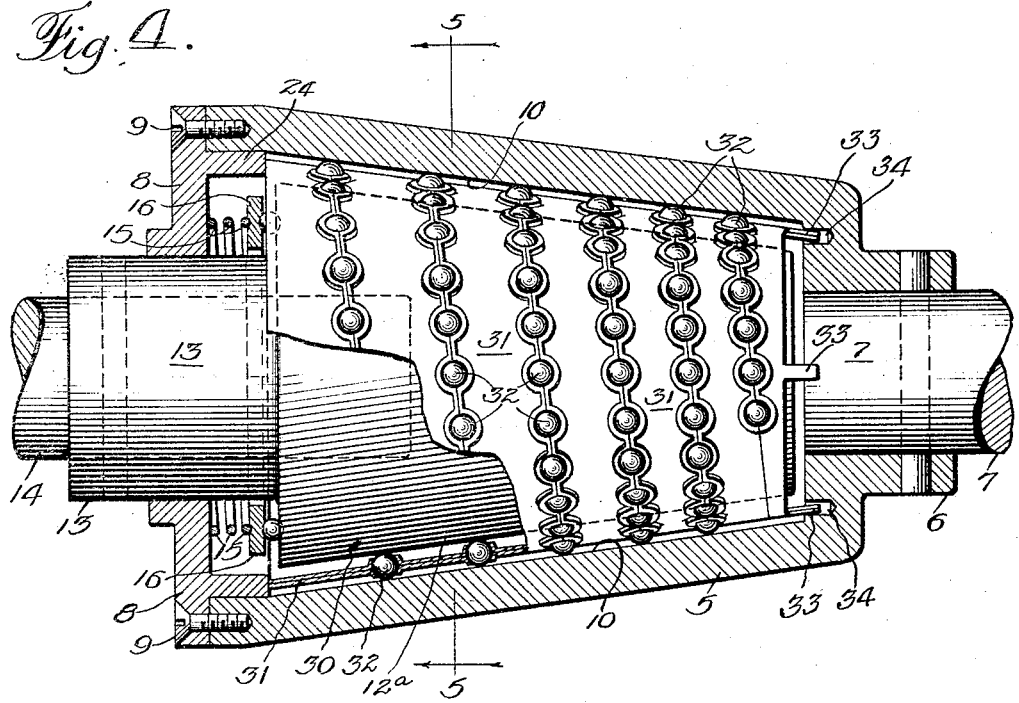
Fig. 4 is a medial longitudinal section of a modified form.
Figure 5:
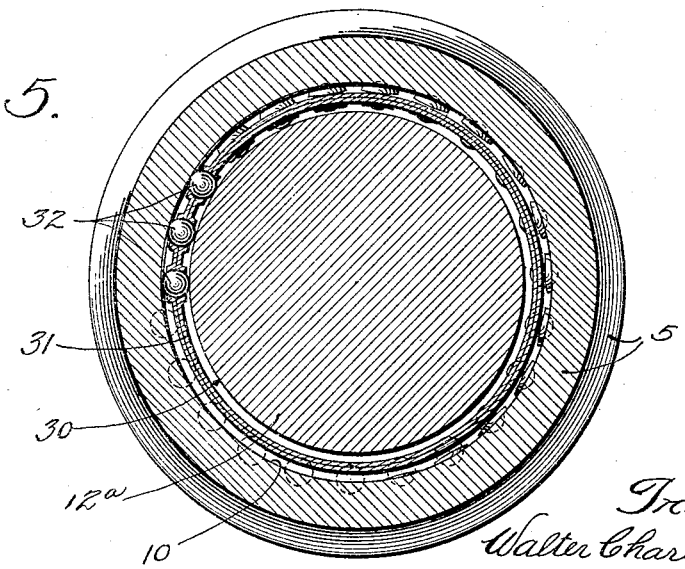
Fig. 5 is a cross section on the line 5—5 of Fig. 4.

Referring to Figs. 4 and 5 the same reference characters will be given to parts corresponding to certain ones in the former figures. In Fig. 4 the inner conically-shaped member 12a has a continuously smooth outer surface 30, thereby differing from the one in Fig. 2 which has a spiral groove for the balls. Between the facing surfaces 10 and 30 of the outer and inner members I provide a cage 31, in conical form and corresponding in shape to the surfaces 10 and 30, this cage being formed to hold balls 32 in spiral arrangement, with the balls severally in contact with the surfaces 10 and 30. The cage 31 should be carried by either the inner or the outer member. I have shown it carried by the outer member by means of extensions 33 integral with the cage and which enter recesses 34 respectively in member 5.

The balls being constrained for limited movement only, they rotate in their entirety about the axis of the clutch. They are also in their entirety arranged along spiral circumferential lines. If, therefore, the rotating member rotates in a direction in which this spiral line would unscrew itself from the companion member, if it were a screw thread, the ball carrying member will recede for axial movement to bring the balls radially a minute distance away from the companion member. But if the ball carrying member is rotated relatively to the other member, so that owing to the spiral arrangement of the entirety of balls, the latter rotate in the direction of a screw which is fastened, the balls will be clamped against the companion member and the two members will then rotate together. Of course, the same effect also can be produced by positively rotating that member which does not carry the balls relatively to the ball carrying member, in such manner that the spiral series of balls is screwed into or out of said member.

The operation of the modified form of Figs. 4 and 5 is the same in all substantial respects as previously described herein.

I contemplate as being included in these improvements all such changes, variations and departures from what is thus specifically illustrated and described as fall within the scope of the appended claims.

I claim:

1. A rotary clutch of the character described comprising a driving member, a driven member, one thereof including an element having a wall defining a conically-shaped recess on the axis of the device, a conically-shaped body carried by the other one of said members on the axis of the device and being in substantially close association with the wall defining said recess, one of said members having spirally-arranged seat elements, balls in said seat elements, and means for maintaining said balls and said wall in close-fitting relation to each other.

2. The device of claim 1 hereof in which said last-mentioned means are adapted to maintain the balls and said wall yieldingly in close-fitting relation to each other.

3. In a rotary clutch of the character described, a conically-recessed outer member, an inner member conforming substantially to the shape of said recess and being in said recess in substantially interfitting relation therewith, one of said members having a spiral groove facing the conical surface of the other member, and balls constrained for limited movement solely thereon carried in said groove and in driving relation to the opposed surface of the other member.

4. The device of claim 3 hereof in which there are also means for yieldingly forcing said members toward each other to maintain said balls against the coacting surface of said other member.

5. The device of claim 3 hereof in which the inner member has said spiral groove wherein the balls are seated while constrained to limited circumferential movement only.

6. A rotary clutch of the character described comprising an outer member having an inner wall defining a conical surface on the axis of the device, an inner member mounted to rotate within and relative to the outer member on the axis of the device and having a conical surface facing the conical surface of the outer member, said conical surfaces being opposed to each other and being correspondingly shaped, one of said members having a spirally-arranged recess in its conical surface for balls, balls in said recess and in close proximity to the opposed conical surface of the other member, with means holding said members against material longitudinal displacement relative to each other, and means for yieldingly maintaining said balls in close contact with the opposed conical surface of the other member.

7. The device of claim 6 hereof in which said balls are in a cage carried by one of said members.

8. In a gripping device, a rotatable member having a plurality of balls in conically-shaped spiral arrangement said member holding the balls against circumferential movement relatively thereto, and said member being shaped to receive in interfitting relation with the balls a conically-shaped member to be driven by the binding action of the balls thereon.

9. In a one-way clutch the combination of, an outer member and an inner member, each having a conically-shaped surface, one of said members being male and the other female and said members substantially interfitting with each other at said surfaces, a plurality of balls in conical helix arrangement carried by one of said members and held against a substantial amount of travel thereon, while contacting the other one of said members on its said conically-shaped surface.

WALTER CHARLES PITTER.